Sept. 17, 1968     W. C. WEHNER     3,401,963
BALL STUD AND METHOD OF MAKING SAME Filed May 16, 1966     2 Sheets-Sheet 1

INVENTOR
WILLIAM C. WEHNER
BY
*Burton E Parker*
ATTORNEYS

Sept. 17, 1968   W. C. WEHNER   3,401,963

BALL STUD AND METHOD OF MAKING SAME

Filed May 16, 1966   2 Sheets-Sheet 2

INVENTOR
WILLIAM C. WEHNER
BY
Burton & Parker
ATTORNEYS

3,401,963
BALL STUD AND METHOD OF MAKING SAME
William C. Wehner, Detroit, Mich., assignor to Moog Industries, Inc., St. Louis, Mo., a corporation of Missouri
Filed May 16, 1966, Ser. No. 550,243
7 Claims. (Cl. 287—87)

ABSTRACT OF THE DISCLOSURE

This disclosure relates to a ball stud having a shank portion joined to a spherical ball head. The spherical head has an axial opening terminating in a flaring annular chamber which deformably receives an annular end of the shank. The axial opening terminates in a plane including the major diameter of the spherical head to distribute the force of deformation of the shank.

The spherical ball head may have a hardened case and a relatively softer core. In this embodiment, the spherical head has a flat portion exposing the core, and the aperture is defined in the flat portion, substantially in the axis of the ball head. The ball head thereby provides a frictional resistance bearing surface and a softer core which provides frictional engagement for the shank which is deformably received in the flaring annular chamber.

---

This invention relates to an improved stud and method of making same. More particularly, this invention relates to an improved ball stud, such as might be used in swivel joints or the like for transmitting tensional or compressional loads between members, as, for example, in vehicular suspension systems.

There are two types of ball studs shown by the prior art; ball studs which have an integrally formed ball head and shank, and ball studs wherein the ball head and shank are formed separately and thereafter joined. The separately formed ball stud is used primarily in swivel joints, such as swivel lamp bases, which are not subjected to shock or heavy loading.

Integral ball studs may be further divided into two classes; studs which are formed from a single blank and have an integral substantially spherical head, and studs which include a head having a separate bearing element. The latter class of ball studs has an integrally formed substantially hemispherical head portion, and a hemispherical annular bearing received beneath the head, which forms a portion of the spherical head. The separate bearing element allows the use of bearing materials more suitable to the particular application, but has other disadvantages discussed below. A typical bearing material used in this type of ball stud is an oil-impregnated powdered metal alloy, which has been compressed to the desired shape. In certain applications, such as in compression loaded ball joints, the stud may be used without the annular bearing.

The integral ball stud places serious limitations on the manufacturing process, and machines, which may be employed in the manufacture of the studs. Conventional integral ball studs are not truly spherical, but have a flat portion opposite the shank. This is a result of the limitations of the process and machines used in the manufacture of the studs. Further, the requisite spherical tolerances cannot be maintained without a considerable increase in cost, and as a result conventional ball studs are generally porous and irregular.

Another problem inherent in conventional integral ball studs results from the fact that the shank and the head portion must obviously be formed of the same material. This problem has been partially met by the type of studs having a separate bearing element, however this type of stud has an integral hemispherical head portion, and the two-part head has other serious limitations, such as tolerance variations, looseness, etc. The material limitation is a disadvantage in that it prevents utilization of materials for the ball head which are not suitable for the shank of the stud. This limitation becomes more important as exotic materials are required for special applications. Further, materials which are suitable for both the head and the shank portions may be prohibitively expensive when used but not required for the shank portion.

The other type of ball stud which has been proposed by the prior art, but which has not gained acceptance commercially in load transmitting ball studs, has a spherical ball head which threadably receives a separately formed shank, or has a pin to retain the shank within the ball head. The threaded connection requires extremely close tolerances, which are expensive to maintain, and which may loosen under load. Further, and most important, this type of ball stud is subject to failure under the conditions encountered by load transmitting ball studs, such as vehicular suspension system ball systems. The threads on the shank, or the apertures for the pin, weakens the structural integrity of the shank and the shank will crack or fail under shock loading. Therefore, conventional ball studs have an integrally formed ball head, as described hereinabove.

The ball stud of my invention eliminates the problems inherent in the prior art studs at a substantial saving in manufacturing costs.

Summary of the invention

The ball stud of my invention includes a generally spherical head portion having a substantially axial opening terminating in a radially outwardly flaring annular chamber. The shank portion has an annular end which is deformably received within the annular chamber and frictionally retained therein against withdrawal. The axial opening in the ball head terminates substantially in a plane including the major diameter of the ball head to distribute the force of deformation of the annular end of the shank, and minimize deformation of the spherical ball head. The two part ball stud construction permits utilization of different materials for the shank and ball head, taking advantage of the characteristics of various materials for the requirements of the shank and ball head.

In the preferred embodiment of the ball stud of my invention, the ball head has a hardened case and a relatively softer core. A flat portion may be provided on the spherical member to expose the softer core, and the aperture is defined in the flat portion substantially in the axis of the spherical member. The shank portion thus deformably engages the softer core of the ball head to provide frictional engagement therewith, and the hardened case provides excellent bearing characteristics for the ball head.

In one embodiment of the ball stud of my invention, a separate, generally conical, insert is provided in the stud head chamber which flaringly engages the inner surface of the annular end of the shank portion. In the other embodiment, the annular opening is formed in the stud head.

According to the method of this invention, the spherical head portion of the stud is formed from a spherical ball, which may be polished within millionths of an inch by presently known manufacturing techniques. Balls are commercially available in such materials as chrome, carbon and stainless steel, brass, bronze, aluminum, Monel, and other materials, with sphericities up to five millionths of an inch. Ball manufacturing costs have been greatly reduced by mass production methods, and developments in the manufacturing process.

However, the advantages of utilizing a spherical ball in the manufacture of a ball stud is not apparent until the manufacturing process of balls is more closely examined. The basic method of finishing ball members, such as ball bearings, is the Hoffman process. In this process, the rough ball is formed in an upsetting machine, which is known as "heading." The ball head on an integral ball stud is formed in the same manner. The crude balls are then filed and ground, heat treated, ground and polished. The Hoffman process, which might be characterized as the critical process in the finishing of ball members, is accomplished by simultaneously rotating and grinding the balls between two parallel plates, one of which is abrasive. One plate is stationary; the other revolves under controlled pressure. This grinding process is repeated several times before and after heat treatment. This is a universal method of finishing accurate spherical surfaces, but it cannot be utilized in the formation of conventional integral ball studs because of the interference of the shank portion. Thus, the conventional ball stud must be finished by expensive special machinery, which is not capable of producing the accuracy of commercially available balls.

The ball member may be hardened, but preferably has a soft core to aid in the frictional retention of the shank. It is understood that some materials, such as steel, must be heat treated to finish the ball surface to the requisite sphericity. An axial opening is then drilled in the ball, and an outwardly flaring chamber is formed adjacent the axial inner end of the opening. A flat may be formed on the ball prior to drilling, if the ball has been case hardened, to expose the relatively softer core. The chamber may be defined by the walls of the ball member, or an insert may be provided which flares the end of the shank into the chamber. A shank having an annular end is inserted into the opening, and urged under pressure to cause the annular end of the shank to deform into the chamber. In actual practice the force required to pull the shank out of the ball head is about twice the force required to rupture a conventional ball joint, and at least thirty times the force required to form the joint between the head and the shank. The sphericity of the ball head is not measurably affected by the forming process.

Other objects, advantages, and meritorious features of this invention will more fully appear from the following specification, claims and accompanying drawings, wherein:

Figure 1:
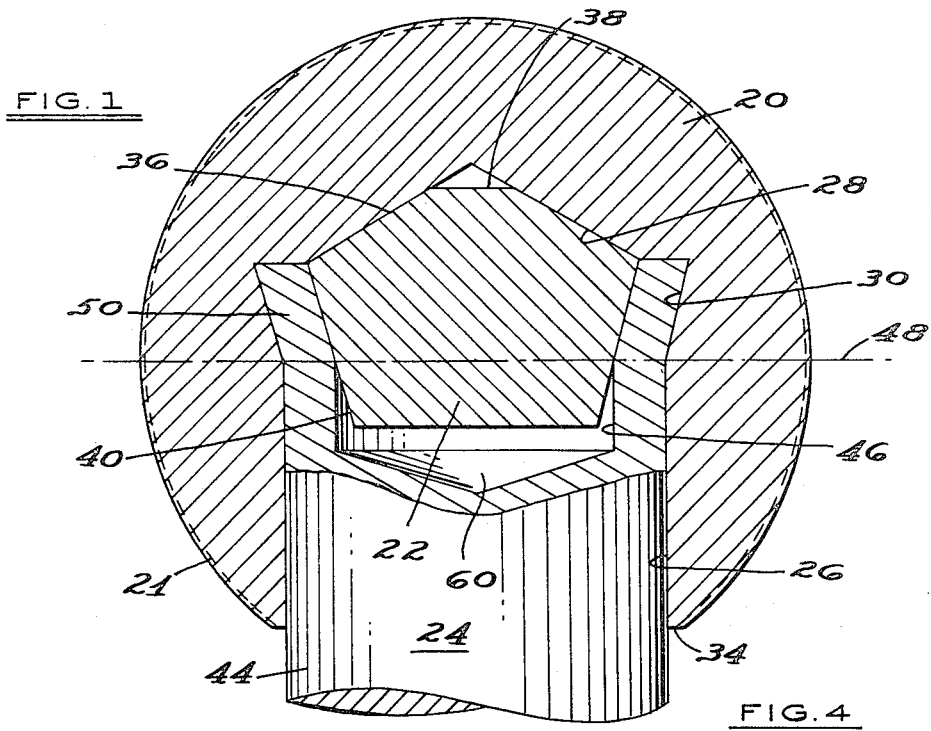
FIG. 1 is a partial cross sectional view of one embodiment of the ball stud of this invention.

In FIGS. 1 to 4 I have shown one embodiment of the ball stud of this invention, wherein the assembly includes a spherical ball head 20, an insert 22, and a shank 24.

As described hereinabove, the spherical head 20 has been formed from a finished ball member. The ball member may be manufactured according to any of the well known commercial ball forming methods, such as heretofore mentioned. The materail used for the spherical head will depend upon the application, and may include any of the materials used in commercially available balls, such as steel, brass, bronze, aluminum, etc., but may also include more exotic materials for special applications. It is noted, however, that ball bearings are generally subjected to high unit loading which requires such material as high chromium steel, heat treated to provide a substantially homogeneous hardened sphere. The ball head of a ball stud, however, is not subjected to high unit loading under normal applications and less expensive materials, such as case-hardened low carbon steel, is satisfactory. Further, a relatively soft core may be desirable in this embodiment of my invention, for the reasons described hereinbelow.

The finished ball member in this embodiment is drilled to provide an axial opening 26, which terminates in a conical drill point 28. Thereafter, a radially outwardly flaring recess 30 is formed adjacent the axial extend of the opening 26. The recess may be formed by any well-known method, and the precise shape of the recess has not been found critical. In the ball stud embodiment shown in FIGS. 1 to 4, a flat 34 has been formed on the ball member prior to drilling which is substantially perpendicular to the axis of the opening 26. This flat will expose the soft core in a case-hardened ball, and will aid in the drilling operation. The case is shown at 21 for illustrative purposes. The flat may be formed by milling, grinding, or any other well-known means.

The insert 22 has a substantially conical upper surface 36 which is seated in the ball head drill point 28. A flat 38 may be provided at the top of the insert to prevent point contact which would allow undesirable rocking in its seat. The lower portion of the insert has a radially outwardly flaring surface 40, which complements the outwardly flaring recess 30 of the ball head to define an annular chamber 42, see FIG. 2, therebetween. In this embodiment, the flaring surface 40 is conical, however any other configuration may be utilized. The insert need not be hardened, and may be formed of any suitable material, such as the material of the core of the ball head, or the material of the shank portion 24.

Figure 2:
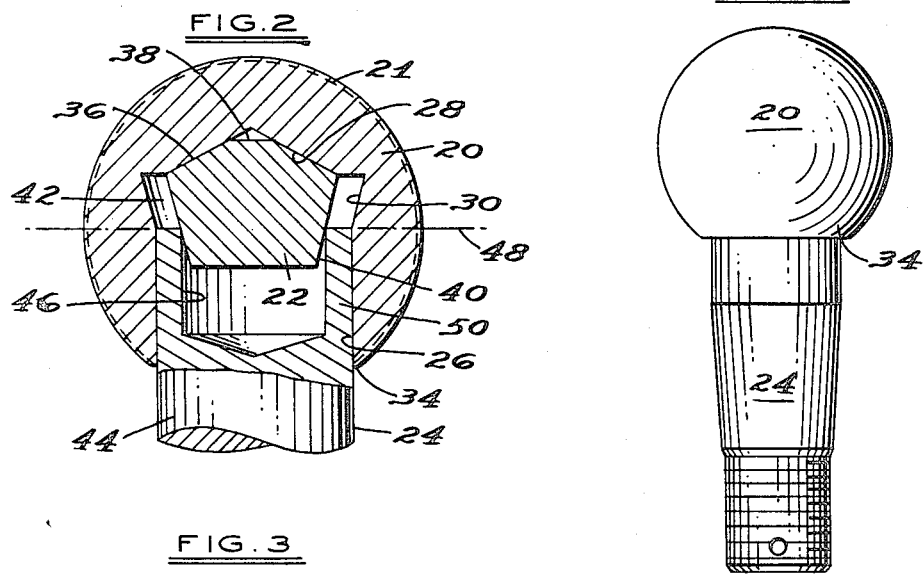
FIG. 2 is a cross sectional view of the embodiment shown in FIG. 1 prior to seating of the stud shank in the ball head.
Figure 3:
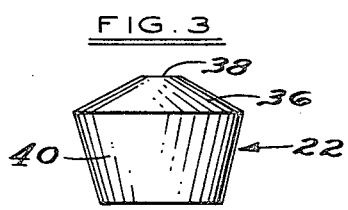
FIG. 3 is a side elevation of the insert shown in FIGS. 1 and 2.
Figure 4:
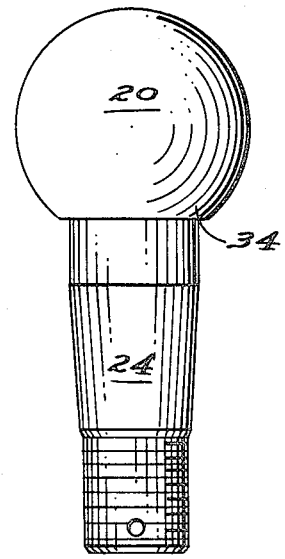
FIG. 4 is a side elevation of the ball stud of this invention.
Figure 7:
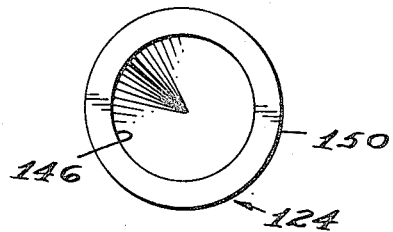
FIG. 7 is an end view of the stud shank prior to seating within the ball head.

The shank 24 initially has a cylindrical end 44, which is drilled axially to provide a recess 46, see FIG. 2. As shown in FIGS. 2 and 7, the stud end is annular and has an outer diameter which is slightly less than the diameter of the opening 26. Thus, the shank will slip easily into the ball aperture until it contacts the insert 22, at substantially the axis of the ball head 48 perpendicular to the axis of the stud. The annular portion of the shank 50 is then urged into the outwardly flaring chamber 42 as by a hydraulic press or the like.

The shank end 50 deforms under this pressure, and is flared into the outwardly flaring chamber under conditions of cold flow. The flaring angle will depend upon the application and the materials utilized, however a 15 degree self locking flaring angle has been found satisfactory to retain the shank of the ball stud in automotive applications. A molecular or microscopic interference is thereby established between the walls of the chamber and the shank 50, which may be characterized as a "cold weld," and which inhibits withdrawal of the shank from the chamber. Further, the shank expands under the pressure of insertion and is urged against the ball aperture wall 26 to aid in the retention of the shank in the aperture 26, and prevent shifting of the shank under load. A case hardened ball head with a soft core will aid in the cold weld described hereinabove, and will not be as expensive as a fully hardened ball member, such as used in conventional ball bearings.

It is noted from FIGS. 1 and 2 that the deformation of the stud shank end 50 occurs substantially in the axis 48 of the ball head, and is evenly distributed about the geometric center of the spherical head 20 because the end of the shank is annular. Thus, the pressure of deformation of the shank end 50 does not affect the sphericity of the ball head 20, and the accuracy of the original ball member is retained. This is an important feature where the application requires close tolerances in the stud head, as in automotive suspension system ball joints. Stresses resulting from the deformation of the shank end 50 will also be relieved by the provision of the chamber 60.

Figure 5:
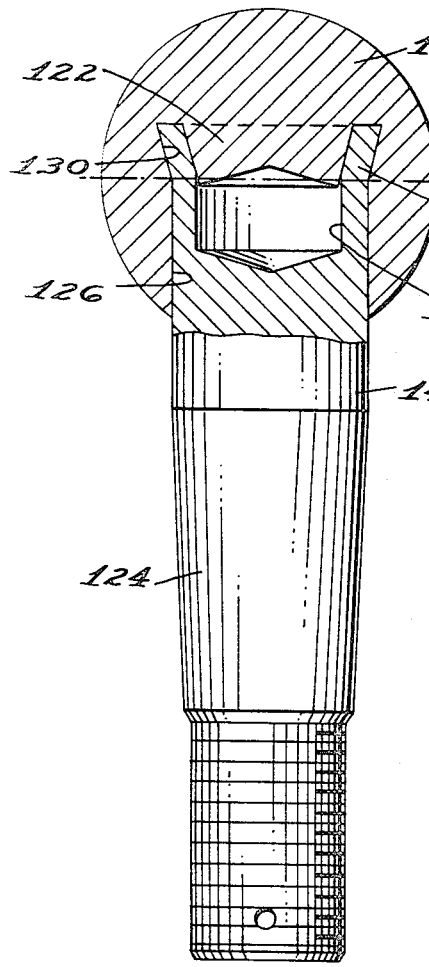
FIG. 5 is a cross sectional view of another embodiment of the ball stud of this invention.
Figure 6:
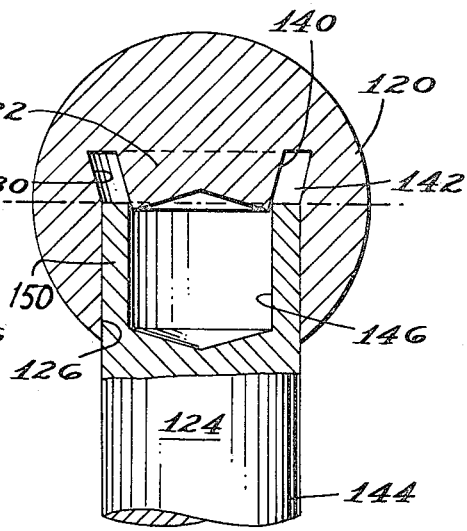
FIG. 6 is a partial cross sectional view of the ball stud embodiment shown in FIG. 5 prior to seating of the stud shank.

FIGS. 5 to 7 illustrate another embodiment of the ball joint of this invention, wherein the insert has been eliminated and the outwardly flaring annular chamber 142 has been cut from the spherical ball head 120. As shown, the ball head aperture 126 has been cut directly into the spherical surface without first grinding the flat, such as shown at 34 in FIGS. 1 and 2. This method will probably be preferred in materials which are not case hardened, such as brass, aluminum, etc., as it eliminates a step in the operation. Otherwise, the embodiment shown in FIGS. 5 to 7 is the same as the structure described hereinabove, and has been numbered accordingly.

It should be understood that changes or modifications in the formation, construction, arrangement, and combination of the several parts of the ball stud described herein may be made without departing from the purview of the appended claims or the principles of my invention.

What is claimed is:

1. A ball stud, comprising: a generally spherical head portion having a substantially axial opening therein terminating in a radially outwardly flaring annular chamber, and a shank portion having an annular end deformably received within said annular chamber and frictionally retained therein against withdrawal, said axial opening in the ball head terminating substantially in a plane including the major diameter of said ball head to distribute the force of deformation of said annular end of the shank and minimize deformation of the spherical ball head.

2. The ball stud defined in claim 1, characterized in that said spherical head portion has a hardened case and a relatively softer core in frictional engagement with the shank portion annular end.

3. The ball stud defined in claim 1, characterized in that said spherical head portion and said stud portion are formed of different materials.

4. A ball stud, comprising: a spherical member having a hardened case and a relatively softer core, said spherical member having a flat portion exposing said softer core and an aperture defined through said flat portion into the softer core substantially in the axis of said spherical member, said aperture terminating in a radially outwardly flaring chamber, and a shank member having an end portion deformably received within said chamber and frictionally retained therein by the walls of said chamber, such that said spherical member has a hardened exterior bearing surface and a relatively softer core frictionally engaging the end portion of said shank member deformably received in said chamber.

5. The ball stud defined in claim 4, characterized in that said end portion of said shank is cold welded to the walls of said chamber by the pressure of deformation.

6. The ball stud defined in claim 4, characterized in that said axial opening terminates in a plane containing the major axis of the ball head substantially perpendicular to the axis of the opening.

7. A ball stud, comprising: a spherical head portion having a substantially axial opening therein terminating in a radially outwardly flaring wall, an insert received within said opening having a radially outwardly flaring surface which complements said wall of said opening to define a chamber therebetween, and a shank having an end portion deformably received within said chamber under the condition of cold flow frictionally retained therein, said axial opening terminating substantially in a plane containing the major diameter of said spherical head portion to distribute the force of deformation of said shank.

References Cited

UNITED STATES PATENTS

| | | | |
|---|---|---|---|
| 1,490,553 | 4/1924 | Barthel. | |
| 1,594,471 | 8/1926 | Short | 287—90 XR |
| 1,655,916 | 1/1928 | Neuberth. | |
| 1,693,848 | 12/1928 | Kyle | 287—20.3 XR |
| 2,065,902 | 12/1936 | Levin. | |
| 2,807,486 | 9/1957 | Bixby | 287—90 |
| 2,999,709 | 9/1961 | Melton et al. | 287—90 |
| 3,073,627 | 1/1963 | Ritter | 287—20.3 XR |

CARL W. TOMLIN, *Primary Examiner.*

A. KUNDRAT, *Assistant Examiner.*